United States Patent
Boissier et al.

(10) Patent No.: US 12,192,077 B1
(45) Date of Patent: Jan. 7, 2025

(54) NETWORK MONITORING COMBINING CLIENT-BASED AND NETWORK-BASED SIGNALS

(71) Applicant: Amazon Technologies, Inc., Seattle, WA (US)

(72) Inventors: Guillaume Boissier, Dublin (IE); Alberto Perandones, Dun Laoghaire (IE); Edin Kozo Becirevic, Adeje (ES)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/853,787

(22) Filed: Jun. 29, 2022

(51) Int. Cl.
| | | |
|---|---|---|
| *H04L 43/04* | (2022.01) | |
| *H04L 43/02* | (2022.01) | |
| *H04L 43/0811* | (2022.01) | |
| *H04L 43/0829* | (2022.01) | |
| *H04L 43/0852* | (2022.01) | |

(52) U.S. Cl.
CPC .............. *H04L 43/04* (2013.01); *H04L 43/02* (2013.01); *H04L 43/0811* (2013.01); *H04L 43/0829* (2013.01); *H04L 43/0852* (2013.01)

(58) Field of Classification Search
CPC ..... H04L 43/04; H04L 43/02; H04L 43/0811; H04L 43/0829; H04L 43/0852
See application file for complete search history.

(56) References Cited

U.S. PATENT DOCUMENTS

| | | | | |
|---|---|---|---|---|
| 9,001,667 | B1* | 4/2015 | Khanna | ................... H04L 43/08 370/245 |
| 2012/0044804 | A1* | 2/2012 | Rahman | .................. H04L 45/22 370/225 |
| 2017/0155544 | A1* | 6/2017 | Khanna | ............... H04L 41/0645 |
| 2018/0091394 | A1* | 3/2018 | Richards | ............. H04L 41/0604 |
| 2023/0011452 | A1* | 1/2023 | Barber | .............. G06F 16/24558 |

* cited by examiner

*Primary Examiner* — Philip J Chea
*Assistant Examiner* — James Ross Hollister
(74) *Attorney, Agent, or Firm* — Klarquist Sparkman, LLP

(57) ABSTRACT

A monitoring service analyzes client-based monitoring data in correlation with network-based monitoring data for paths between two endpoints in a network upon request from a client. The endpoint can be any valid private IP address or DNS name where traffic is to be sent. Clients may define parameters for the monitoring, including thresholds for identifying network issues based on the client-based monitoring data. Different levels of network-based monitoring may be performed responsive to results of the correlation and continued performance determinations relative to the thresholds. The client-based and network-based monitoring data may include reports of performance signals, such as packet loss and round-trip time or other measured latency, as well as events such as connection issues and timeouts. The monitoring data from the different sources can be compared to determine whether a network issue is present in the network or outside of the network/in the client.

20 Claims, 8 Drawing Sheets

NETWORK MONITORING COMBINING CLIENT-BASED AND NETWORK-BASED SIGNALS

BACKGROUND

Large computer networks, such as those used in cloud computing, may contain hundreds or thousands of components of several types, such as switches, routers, and hubs, which are interconnected with links. Generally, network routers receive packets on input ports and transmit the received packets to output ports based on a configuration of the network router. A forwarding table controls which next hops receive the packets. Typically, the forwarding table is programmed in accordance with routing strategies, such as equal-cost multi-path (ECMP) routing, which is a strategy where next-hop packet forwarding to a destination can occur over multiple best paths.

Latency and packet loss are important metrics for testing of a network. Network operations and engineering teams use latency and packet loss determinations to identify and fix network performance problems. The latency experienced between a network source and a network destination is determined by the sum of link propagation latencies for the links on the network path between them, and the sum of the switching and queuing latencies at each router hop that interconnects those links. Networks are dynamic and as changes are made to the network topology and configuration, either intentional or due to issues in the network, the paths used between a source and a destination can change. As traffic loads change, the queuing latencies at each hop change. As a result, it can be difficult to know what the expected network latencies should be between any source/destination pair. Packet loss occurs when a packet transmitted from a source host server computer is not reached by a destination computer. Packet loss can occur for multiple reasons, such as dropped packets due to an overloaded buffer on a network switch. For users that have private network segments operating within a cloud provider (also called a compute service provider), it is difficult to know whether any latency, packet loss, or other network problems are due to the cloud provider, the private network segments, applications/devices on the network, and/or other sources.

DETAILED DESCRIPTION

A monitoring service can be configured to transmit network packets from a user's source network segment to a user-defined endpoint upon request from a user. The endpoint can be any valid private Internet Protocol (IP) address or Domain Name System (DNS) name where traffic is to be sent. Users can further define endpoints between which traffic is communicated and thresholds for metrics associated with the communication of traffic between the endpoints. Probes can be transmitted between the endpoints, and can report metrics, such as packet loss and round-trip time or other measured latency. The metrics can be compared against network-based monitoring metrics to determine whether any issues are associated with the compute service provider or associated network generally, or with a client-side component involved in the communication (or outside network). A signal can then be transmitted to the client including information as to whether a problem is inside or outside the monitored network.

Figure 1:
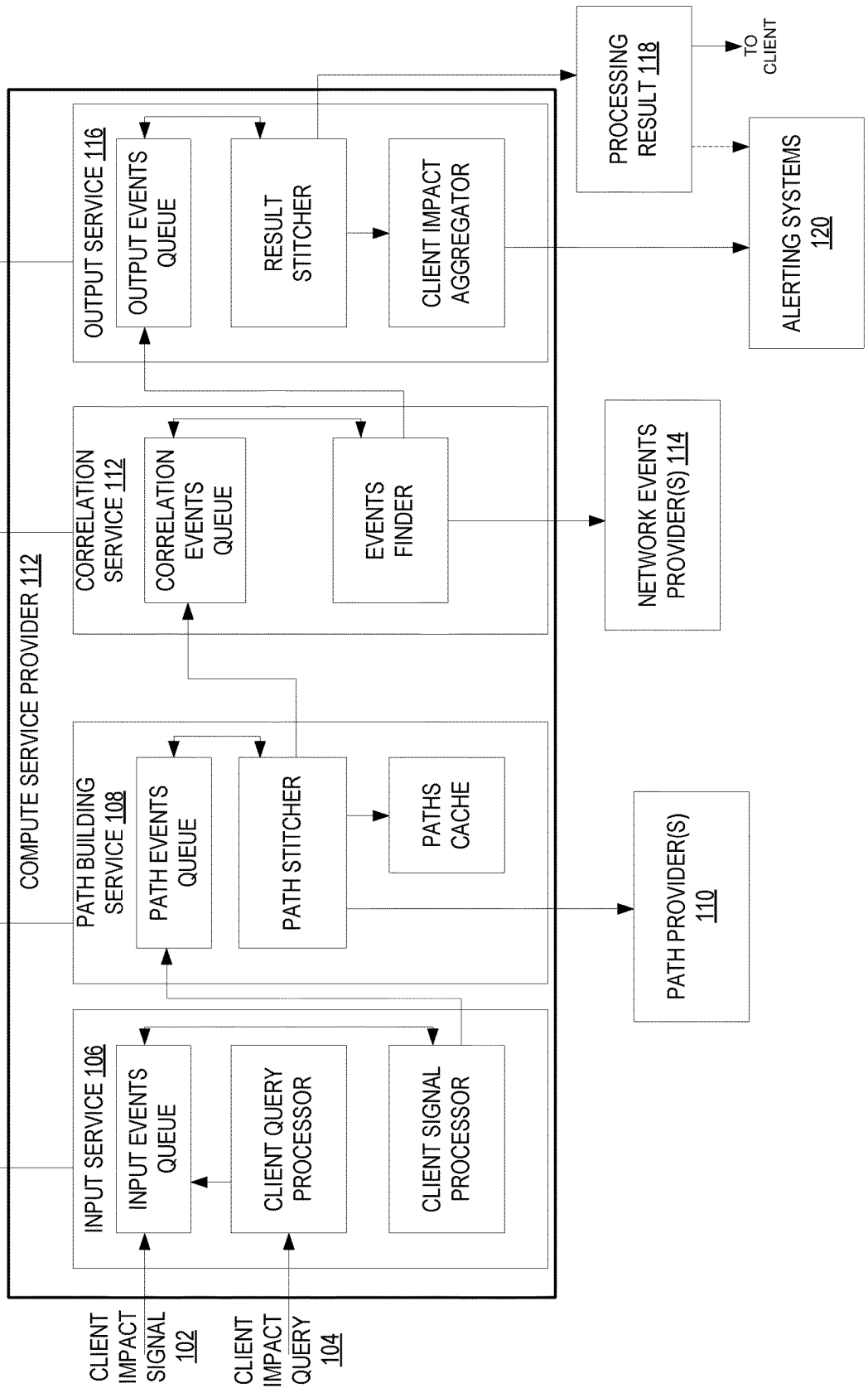
FIG. 1 is a system for monitoring a network by examining a correlation between client-based monitoring signals and network-based monitoring signals.

FIG. 1 is an embodiment of a monitoring system 100 including a compute service provider 112 (e.g., a cloud-based computing provider). The compute service provider 112 may be included in and/or associated with a managed network to which a client device is connected. The client device operating on the managed network may transmit information regarding network performance data experienced by, for example, an application executing on the client device to access services or otherwise communicate data in the managed network. The information may include a client impact signal 102 and/or a client impact query 104. The client impact signal may include information relating to monitoring data captured from the perspective of the application executing on the client device, such as measurements of latency, packet loss, jitter, etc., and/or event signals such as connection loss/spike events (e.g., connection losses and/or spikes), resource unreachable or unavailability notifications, timeout notifications, etc. The impact signal 102 and/or the client impact query 104 may identify two endpoints corresponding to a path along which the signal measurements/events are measured/detected. For example, the client impact query/signal may include a network segment, which is a network segment within the managed network associated with the compute service provider 112. The network segment can have a range of IP addresses that are assigned to use by the network segment. Typically, the endpoint(s) and/or network segments may include a server computer that can receive and return pings for the purposes of latency calculations. The network segment can include a plurality of networking components, including server computers, routers, and data storage. As described in more detail below with respect to FIG. 2, the server computers (not shown) of the network segment can run applications that use services of the compute service provider 112.

The client impact query 104 may additionally or alternatively include a request to begin an active monitoring session using the client impact signal 102 (e.g., where the client impact signal may be an ongoing signal providing real-time results from measuring/monitoring services running locally to the client device and/or executing as one or more cloud-based applications running on one or more client computing instances in a cloud-based computing environment). The request from the client impact query 104 may include one or more thresholds corresponding to levels of concern that different measurements/events may cause for a client. For example, the thresholds may include a first threshold indicating that the measurements/events correspond to a decrease in expected performance and a second threshold indicating that the measurements/events correspond to a detected impact on the client's usability of the managed network.

A user operating on the user network can transmit the client impact signals and/or query 102/104 using an Application Programming Interface (API) in some examples. The API can be received by the compute service provider 112 to perform a service. Services are commonly used in cloud computing. A service is a software function provided at a network address, such as over the Internet or another network. Clients initiate service requests to servers and servers process the requests and return appropriate responses. The client service requests are typically initiated using, for example, an API request. For purposes of simplicity, service requests will be generally described below as API requests, but it is understood that other service requests can be made. An API request is a programmatic interface to a defined request-response message system, typically expressed in JSON or XML, which is exposed via the web-most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

The client impact signal 102 and client impact query 104 can be received by the compute service provider 112 in an input service module 106, which analyzes the parameters of the API request and generates a path event corresponding to the query 104. For example, input metrics from the signal 102 that indicate a performance issue (e.g., performance degradation that meets a defined threshold) may be collected in an input events queue. Additionally, queries 102 received from the client may be processed by a client query processor to generate input events to add to the input events queue based on a corresponding client request. The input events may be analyzed by a client signal processor to generate a path event indicating a path, endpoint, and/or other location information associated with detected/suspected performance issues. For example, a path event may indicate that traffic sent to a selected endpoint and/or along a selected path is experiencing performance degradation (e.g., an increase in packet loss, transit delays, etc.).

The path events are provided to a path events queue of a path building service 108, which further includes a path stitcher configured to retrieve the path events from the path events queue and select different candidate paths (static or dynamic), also called candidate routes through the network segment to arrive at a destination endpoint(s), where the candidate paths correspond to the path events from the queue. For example, the client experiencing the performance degradation may identify the degradation based on signals measured along a path between a pair of endpoints. The path from the client's perspective may be a single path based on an overlay network (described in more detail below with respect to FIG. 2) used by the client, whereas an underlay network (also described in more detail below with respect to FIG. 2) that includes the physical infrastructure used to transmit the traffic between the endpoints may provide a large number of possible paths through which the traffic may flow. Accordingly, in order to correlate the performance degradation experienced by the client, the path building service 108 may examine network topology for the underlay network to identify different paths corresponding to a path event involving one or more endpoints identified by the client as being associated with performance degradation, such as follows:

Subnet A-Gateway 1-Gateway 2-Interface 1-endpoint

Subnet B-Gateway 3-Gateway 4-Interface 2-endpoint

In some examples, the path providers 110 may include internal systems having path-related information (e.g., from network monitoring systems, network state management, etc.) that provide path candidates at different levels of precision/resolution. The path providers 110 may provide topology information that enables the path building service 108 to identify paths to analyze for network events that correlate with the client impact signal, as described in more detail below with respect to correlation service 112. In some examples, the paths/subnets may be stored in a paths cache and used by path providers 110 to generate and/or propagate probes along the paths (e.g., via a probe injector). In some examples, a probe injector can couple an interface to the network segment. The interface can be a logical networking component that represents a virtual network card. The interface can include one or more of the following attributes: 1) A primary address range (e.g., IPV4 address range, IPV6 address range, etc.); 2) One or more secondary address ranges; 3) one or more security groups; and 4) a MAC address. Other attributes can be added. The probe injector can then transmit probes through the network segment using the interface. The probes may be configured to follow the rules of the network segment. As such, the probes imitate actual network traffic through the network segment towards the endpoint, thereby mimicking the client's traffic flow through the network. The endpoint can be, for example, a server computer that receives the probes as ICMP pings and responds in accordance with the protocol.

The probe injector can obtain packet loss and latency metrics (other metrics can be included) using the probes and submit the probes to an analysis component, such as the compute service provider 112 and/or a network monitoring service for analysis. The analysis component, which can be on a server computer, can pull data from a database or other storage service, which includes candidate paths through the network segment, which the probes might have traversed. Additionally, the analysis component can retrieve network monitoring metrics from a database or other storage service, which is health monitoring metrics collected by the compute service provider 112, based on all network traffic through the compute service provider 112 (e.g., by multiple users). For metrics that exceed predetermined thresholds (which can be set by the client as described above), the analysis component may generate events (e.g., via network events provider(s) 114, described in more detail below).

The path stitcher may provide correlation event data to a correlation events queue of a correlation service 112 for analyzing the managed network-based monitoring results in correspondence with the input signals from the client (e.g., client impact signal 102). For example, the correlation service 112 may include an events finder configured to retrieve network events from network events providers 114 (e.g., results of probes sent through the network either due to path building service or as routing monitoring results) and correlate the events with detected network issues indicated by the client impact signal 102. For example, if the network events providers 114 indicate issues along the path identified by the path building service 108 that may explain and/or be a root cause for the information (e.g., performance signals) indicated by the client impact signal, the impact indicated by the client impact signal may be confirmed. Otherwise, the result of the correlation may indicate that either further investigation is to be performed, or that the issue is not with the managed network.

The results of the events finder may be provided to an output events queue of an output service 116. The output service 116 may include a result stitcher configured to retrieve the output events from the output events queue and generate corresponding processed results 118, such as indications of whether impact events are determined to be found on the determined path(s) from the path building service 108. The output service 116 may also include a client impact aggregator configured to aggregate results from the results stitcher to determine which clients can expect to experience an impact from any detected network issues. For example, if the results from the results stitcher indicate a potential network issue in a selected network device or region, other clients that send traffic through that selected network device or region may be notified of potential performance degradation and/or a mitigation operation (e.g., traffic rerouting, etc.) may be performed to decrease the effect of performance degradation on the other clients. In some examples, the client impact aggregator may also be configured to aggregate impact signals from multiple clients to further correlate the client impact signal 102. For example, if the events finder of the correlation service 112 does not reach a conclusion that a network event is related to performance degradation indicated by the client impact signal 102, yet other clients (e.g., more than a threshold number of other clients) are experiencing similar performance degradation, the system may return to the path building service 108 to generate a more targeted path(s) that services traffic from the affected clients for additional analysis. Corresponding alerts may be generated and provided from the client impact aggregator and/or the processing results 118 to one or more alerting systems 120 and/or to the client providing the client impact signal 102. For example, the alerting systems may correspond to network management entities to inform the management entities that mitigation may be prudent in light of detected issues in the network. In some examples, a mitigation process may include switching traffic from one or more clients to an alternative path that is not impacted by the correlated network event. The alerting systems 120 may also be configured to inform clients of the findings of the correlated monitoring process described above (e.g., to inform clients that an issue likely is not a result of an issue on the managed network or to inform clients that the issue is likely on the managed network and is being mitigated). In some example, data storage device(s) 122 may store data from one or more of the services 106, 108, 112, and/or 116 as historical data to improve functioning of the system 100. For example, the results of the correlation and/or processing results 118 may be stored in data storage 122 to log events on the network. In some examples, the correlation results may be fed back into the correlation service 112 to continue training the events finder to find correlations between detected events and client impact signals.

Figure 2:
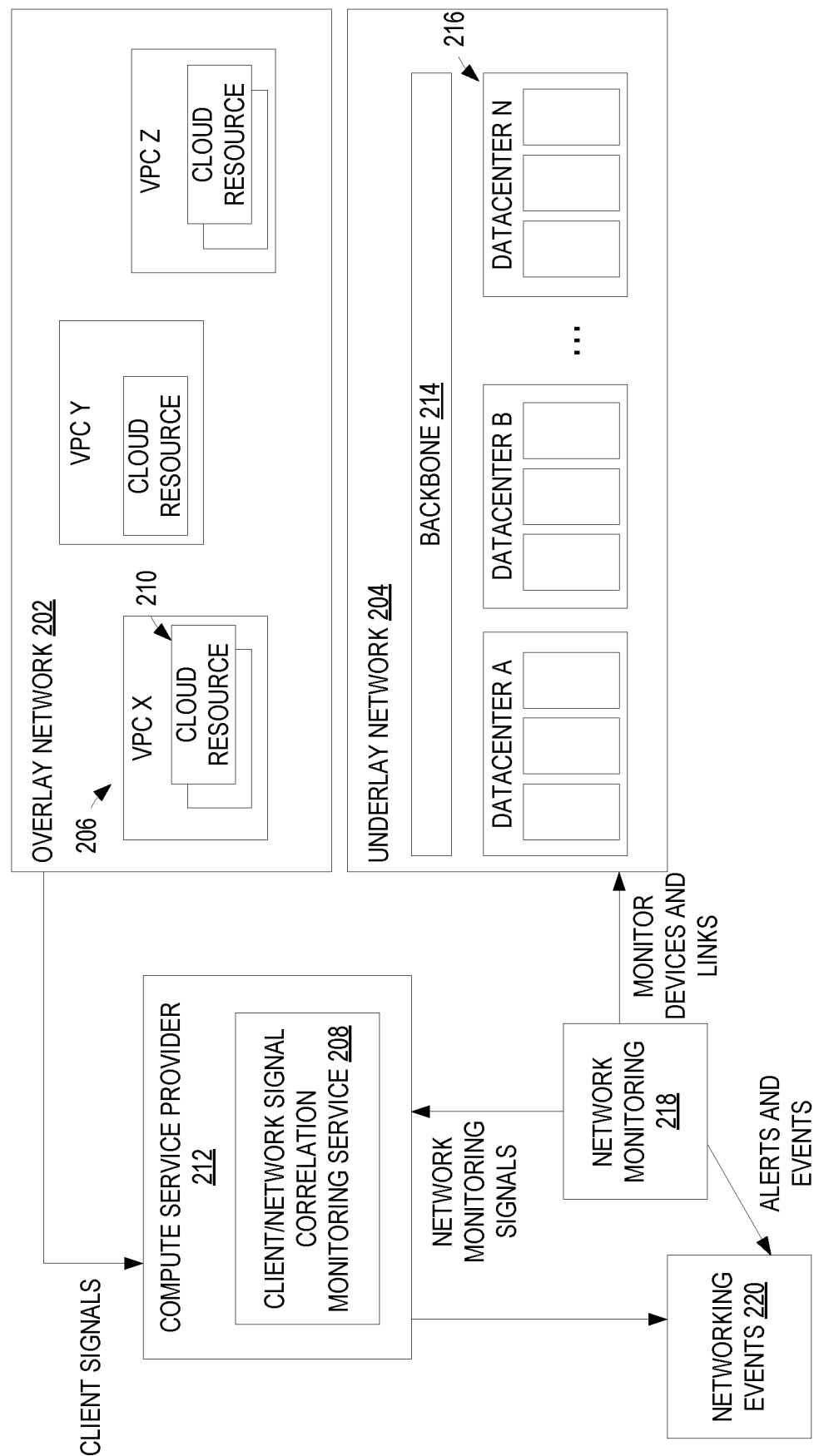
FIG. 2 is schematic diagram illustrating an example network environment in which a correlation-based monitoring system in accordance with the present disclosure may be implemented.

FIG. 2 shows a high-level, simplified view of a monitoring system 200 including an overlay network 202, an underlay network 204, and a compute service provider 212. The overlay and underlay networks may be associated with the compute service provider 212. The compute service provider 212 may include a client/network signal correlation monitoring service 208, which may include one or more of the service modules of compute service provider 112 of FIG. 1.

The overlay network 202 may be a software-defined layer of network abstraction used to run multiple separate, discrete virtualized network layers over a network of virtual private clouds (VPCs). For example, one or more VPCs 206, respectively providing one or more cloud resources, may be included in the overlay network 202. The underlay network 204 may include the physical structure above which the overlay network is built. For example, the underlay network 204 includes one or more datacenters 216 and/or other network devices configured to communicate (e.g., transmit data) over a backbone 214. Traffic from the VPCs 206 may be encapsulated in the overlay network 202 in order to route the traffic on top of the underlay network infrastructure. Clients utilizing the overlay network 202 may report client signals of performance to the compute service provider 212 from the perspective of clients in the overlay network 202, while one or more network monitoring services 218 may monitor devices and links in the underlay network 204 and provide corresponding network monitoring signals to the compute service provider 212 from the perspective of the underlay network 204. The client/network signal correlation monitoring service 208 may correlate the client signals and the network monitoring signals to determine whether events on the underlay network (e.g., identified by the network monitoring signals) may explain and/or otherwise indicate performance degradation indicated by the client signals. Examples of the correlation are described in more detail below with respect to FIG. 6.

Events detected by the network monitoring service 218 and/or results of the correlation may be provided to a networking events module 220. For example, the networking events module 220 may alert managing entities for the network to initiate operations to mitigate network events. In other examples, the networking events module 220 may store events for access by other modules, such as client alert modules to alert clients of detected network events.

Figure 3:
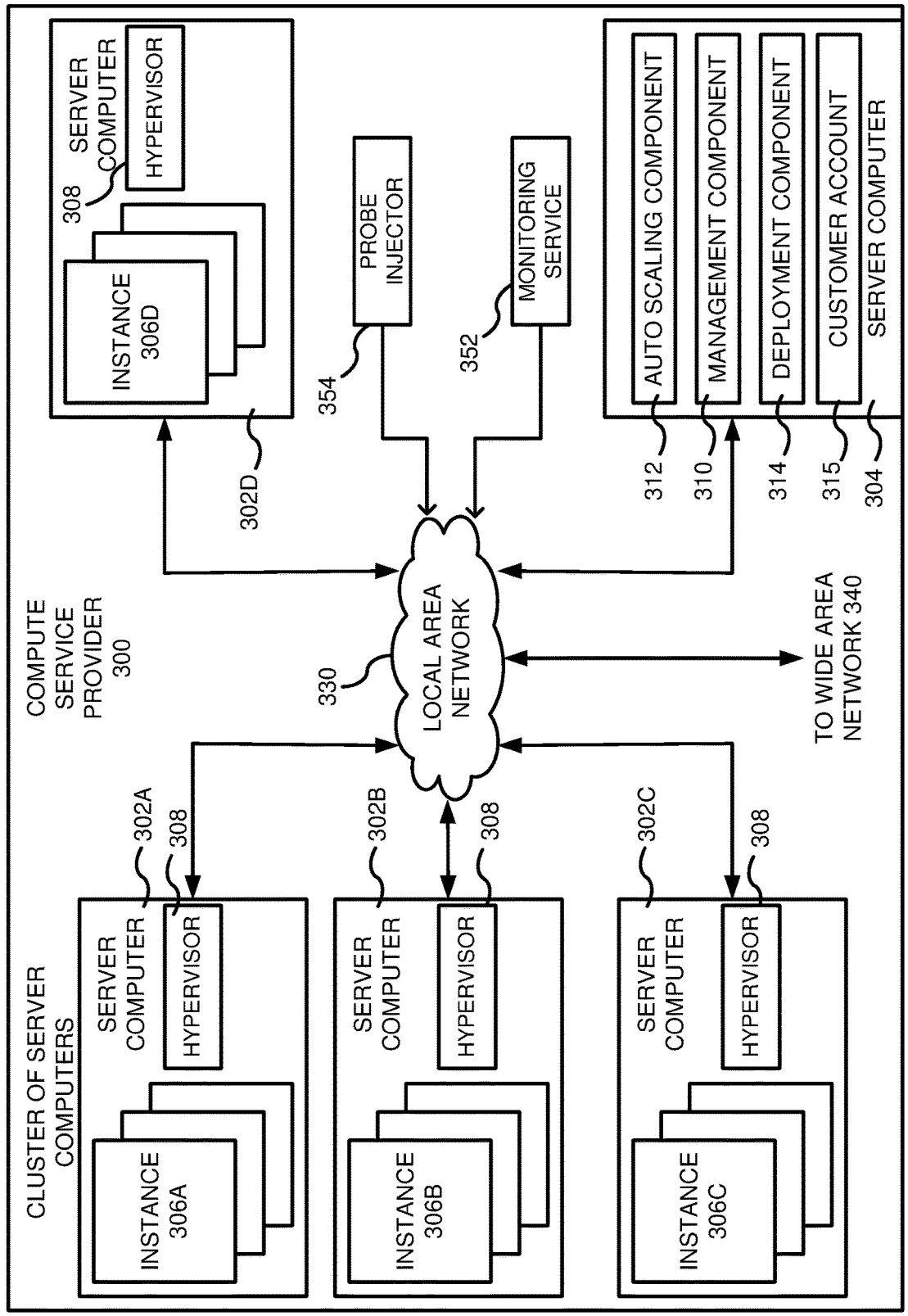
FIG. 3 is an example system diagram showing a plurality of virtual machine instances running in the multi-tenant environment.

FIG. 3 is a computing system diagram of a network-based compute service provider 300 that illustrates one environment in which embodiments described herein can be used. The compute service provider 300 is one embodiment giving further details of the compute service providers 112, 212, of FIGS. 1 and 2. By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

In some implementations of the disclosed technology, the computer service provider 300 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone.

A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e., a computer) that executes applications like a physical machine. In the example of a virtual machine, each of the servers 302A-302D can be configured to execute a hypervisor 308 or another type of program configured to enable the execution of multiple instances 306 on a single server. Additionally, each of the instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. For example, the server computer 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

Customer account information 315 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, protocols used in the source user network segments, etc.

A network 330 can be utilized to interconnect the server computers 302A-302D and the server computer 304. The network 330 can be a local area network (LAN) and can be connected to a Wide Area Network (WAN) 340 so that end users can access the compute service provider 300. It should be appreciated that the network topology illustrated in FIG. 3 has been simplified and that many more networks and networking devices can be utilized to interconnect the various computing systems disclosed herein.

A monitoring service 352 can execute on a server computer and can operate similar to the monitoring service 208 of FIG. 2 and/or one or more of the service modules of the compute service provider 112 of FIG. 1. Software associated with the monitoring service 352 can likewise execute on one of the instances 306. The monitoring service 352 can obtain metrics from various sources, as described above, and make determinations relating to which network resources in the system are problematic. A probe injector 354 can also execute on a server computer and can execute on one or more of the instances 306. The probe injector 354 can be similar to the probe injectors discussed with regard to FIGS. 1 and 2, and can inject probes between two endpoints. The instances 306 can also operate as endpoints, which receive the probes and transmit the probes back to the probe injector for latency and packet loss determinations.

Figure 4:
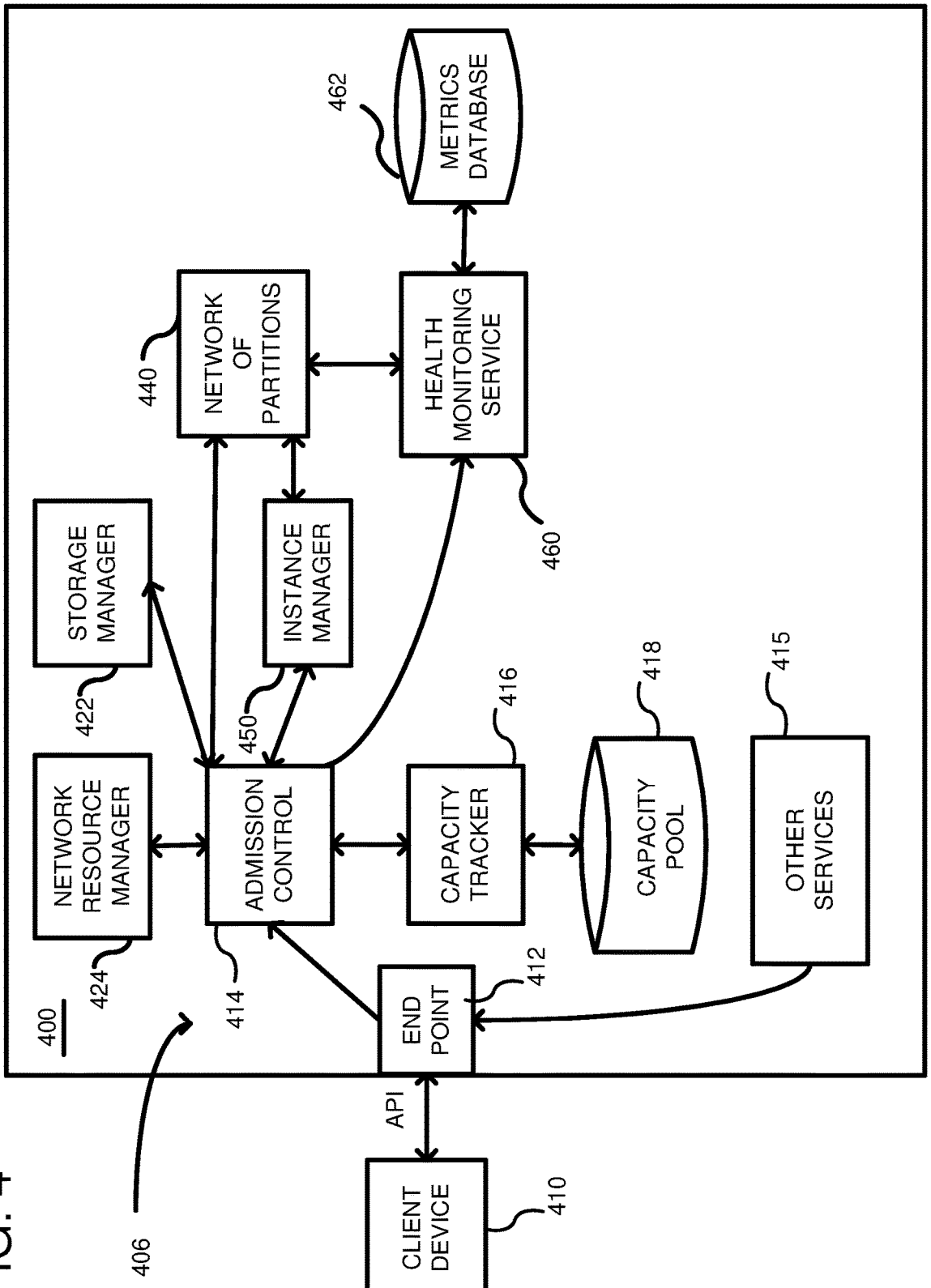
FIG. 4 shows further details of an example system including a plurality of management components associated with a control plane.

FIG. 4 illustrates in further detail management components 406 that can be used in the multi-tenant environment of the compute service provider 400. In order to access and utilize instances (such as instances 306 of FIG. 3), a client device can be used. The client device 410 can be any of a variety of computing devices, mobile or otherwise including a cell phone, smartphone, handheld computer, Personal Digital Assistant (PDA), desktop computer, etc. The client device 410 can communicate with the compute service provider 400 through an end point 412, which can be a DNS address designed to receive and process API requests. The client device 410 can be associated with a user network such as 204 from FIG. 2. In particular, the end point 412 can be a web server configured to expose an API. Using the API requests, a client 410 can make requests to implement any of the functionality described herein. Other services 415, which can be internal to the compute service provider 400, can likewise make API requests to the end point 412.

Other general management services that may or may not be included in the compute service provider 400 include an admission control 414, e.g., one or more computers operating together as an admission control service. The admission control 414 can authenticate, validate and unpack the API requests for service or storage of data within the compute service provider 400. The capacity tracker 416 is responsible for determining how the servers need to be configured in order to meet the need for the different instance types by managing and configuring physical inventory in terms of forecasting, provisioning and real-time configuration and allocation of capacity. The capacity tracker 416 maintains a pool of available inventory in a capacity pool database 418. The capacity tracker 416 can also monitor capacity levels so as to know whether resources are readily available or limited. An instance manager 450 controls launching and termination of instances in the network. When an instruction is received (such as through an API request) to launch an instance, the instance manager pulls resources from the capacity pool 418 and launches the instance on a decided upon host server computer. Similar to the instance manager are the storage manager 422 and the network resource manager 424. The storage manager 422 relates to initiation and termination of storage volumes, while the network resource manager 424 relates to initiation and termination of routers, switches, subnets, etc. A network of partitions 440 is described further in relation to FIG. 5 and includes a physical layer upon which the instances are launched.

A health monitoring service 460 can provide monitoring for resources and the applications users run on the compute service provider 400. System administrators can use the monitoring service 460 to collect and track metrics, and gain insight to how applications are running. For example, the monitoring service 460 can allow system-wide visibility into application performance and operational health. Metrics generated by the health monitoring service 460 can be stored in the metrics database 462. It is this metrics database 462 that can store the network monitoring metrics. The health monitoring service 460 reviews metrics from all network devices in the compute service provider 400, rather than any particular source user network segment.

Figure 5:
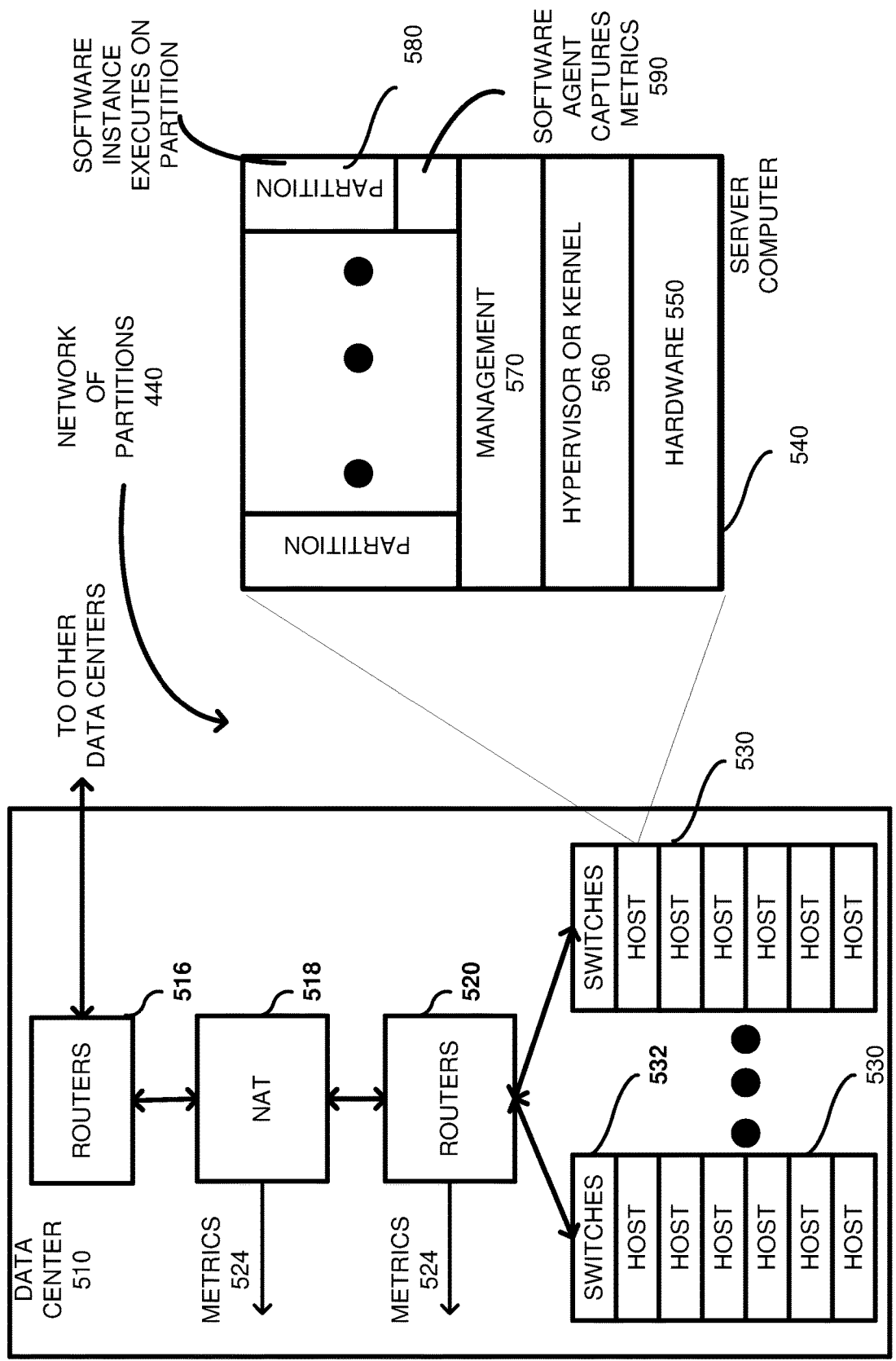
FIG. 5 shows an example of a plurality of host computers, routers and switches, which are hardware assets used for running virtual machine instances with local agents to capture metric data.

FIG. 5 illustrates the network of partitions 440 and the physical hardware associated therewith. The network of partitions 440 can include a plurality of data centers, such as data center 510, coupled together by routers 516. The routers 516 read address information in a received packet and determine the packet's destination. If the router decides that a different data center contains a host server computer, then the packet is forwarded to that data center. If the packet is addressed to a host in the data center 510, then it is passed to a network address translator (NAT) 518 that converts the packet's public IP address to a private IP address. The NAT also translates private addresses to public addresses that are bound outside of the datacenter 510. Additional routers 520 can be coupled to the NAT to route packets to one or more racks of host server computers 530. The routers and the NAT can transmit metrics (passive or active-based) 524 to the health monitoring service 460. Passive metrics can include counter data, which can be used to determine packet loss and latency. Each rack 530 can include a switch 532 coupled to multiple host server computers. A particular host server computer is shown in an expanded view at 540.

Each host 540 has underlying hardware 550 including one or more CPUs, memory, storage devices, etc. Running a layer above the hardware 550 is a hypervisor or kernel layer 560. The hypervisor or kernel layer can be classified as a type 1 or type 2 hypervisor. A type 1 hypervisor runs directly on the host hardware 550 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 570 can be part of the hypervisor or separated therefrom and generally includes device drivers needed for accessing the hardware 550. The partitions 580 are logical units of isolation by the hypervisor. Each partition 580 can be allocated its own portion of the hardware layer's memory, CPU allocation, storage, etc. Additionally, each partition can execute its own virtual machine including a guest operating system. As such, each partition is an abstract portion of capacity designed to support its own virtual machine independent of the other partitions.

The virtual machine executing on a partition can include one or more applications and an operating system. Either the applications themselves or the operating system can include an agent 590, used to capture the log data. The log data can be passed by the agent through the management layer 570 to the health monitor 460 (FIG. 4). More specifically, some parameters of the virtual machines executing on the partitions can be monitored using the management layer 570, which can then pass the metrics to the health monitoring service 460 for storage in the metrics database 462. Additionally, the management layer 570 can pass to the health monitoring service 460, the number of instances that are running, when they were launched, the operating system being used, the applications being run, etc. All such metrics can be used for consumption by the health monitoring service 460.

Figure 6:
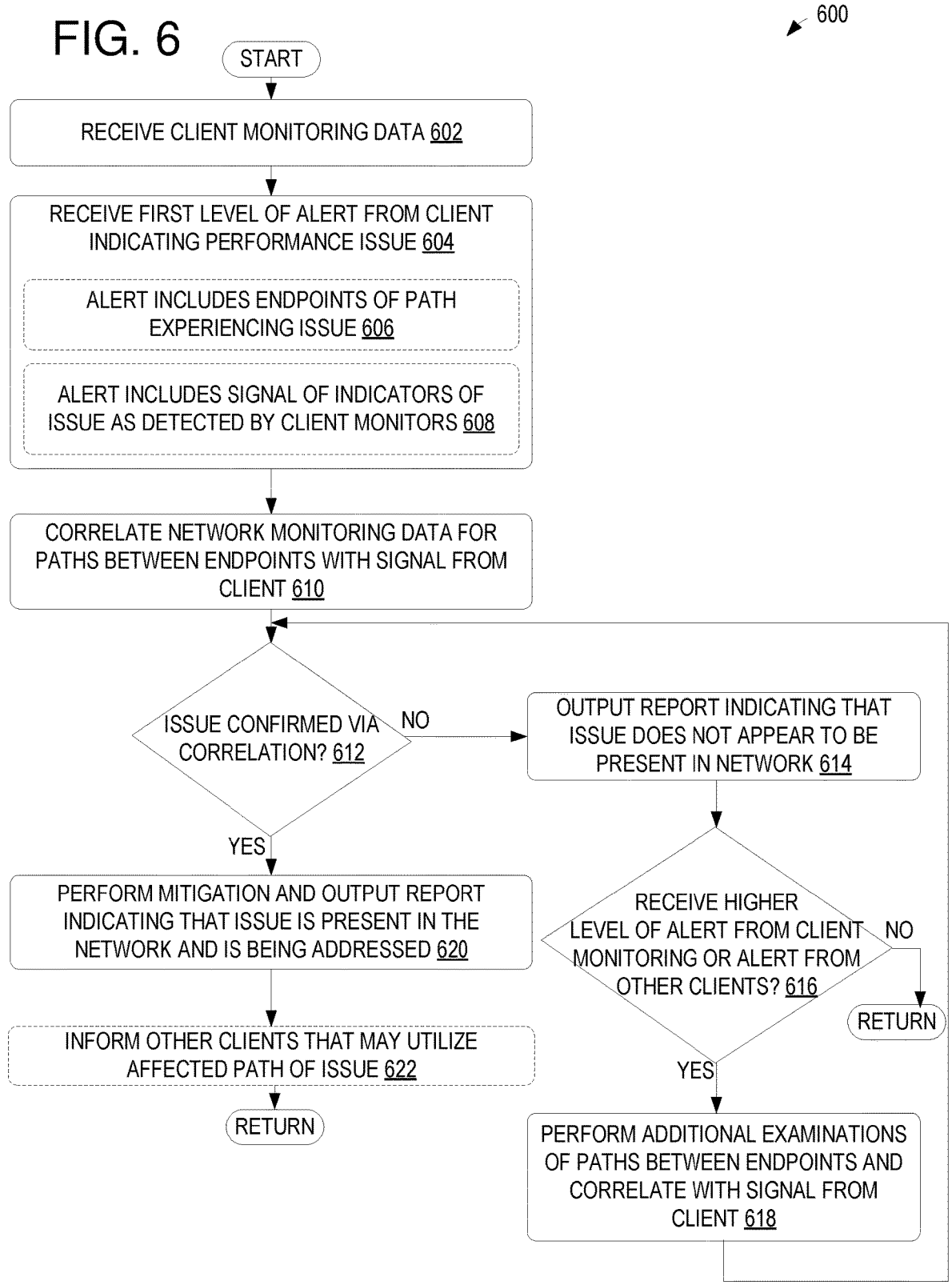
FIG. 6 is a flowchart of a method according to one example for monitoring a network.

FIG. 6 is a flowchart of a method 600 according to one example for monitoring a network. In process block 602, client monitoring data is received at a monitoring service, such as a monitoring service provided by computer service provider 112 of FIGS. 1 and/or 212 of FIG. 2. The client monitoring data may include signals, such as performance signals, indicating one or more parameters of client traffic and/or events experienced by client device(s) attempting to access a destination in the network. For example, the monitoring data may include real-time measurements of parameters such as latency, packet loss, jitter, connection loss/spike events, unreachable or unavailable resource events, timeout events, etc.

At 604, a first level of alert may be received from the client and/or determined based on the client monitoring data received at 602. For example, the client monitoring data may include a designation of one or more thresholds for the client monitoring data (e.g., performance signals indicated by the client monitoring data) which, when exceeded (e.g., in examples where the threshold is a maximum threshold) or underrun (e.g., in examples where the threshold is a minimum threshold), indicate a performance issue. In this way, the client can tune to a level of sensitivity for particular metrics as desired. As indicated at 606, the alert may indicate and/or be associated with two endpoints of a path along which the presumed network issue (e.g., the identified performance issue/degradation) is occurring. As indicated at 608, the alert may additionally include a signal of indicators of the issue (e.g., a subset of the client monitoring data that relates to the exceeding of the threshold) as detected by the client-based monitors.

At 610, the method includes correlating network monitoring data and/or determinations based thereon (e.g., determined networking events and/or existing network monitoring data for corresponding time points to the client monitoring data that exceeded the threshold) for paths between the endpoints with the signal from the client. For example, a set of routes or paths through the network between the endpoints may be computed, and the network monitoring data for that set of routes or paths may be examined to determine if network performance (e.g., networking events indicated by the network monitoring data) along the routes or paths supports the conclusion of a network performance issue. The correlation may include determining or identifying events on one or more paths between the endpoints using the network monitoring data, and determining whether the events may be associated with and/or be a root cause for performance degradation reported via the client monitoring data (e.g., the client monitoring data that exceeds or underruns one or more thresholds). For example, the correlation may first include determining whether any events are detected on paths between the endpoints (if no events are detected, the system may determine that there is no network-based issue corresponding to the performance degradation experienced/reported by the client). If at least one event is detected, the event may be analyzed to determine if the features of the event (e.g., the location, duration, type, etc. of the event) could cause the performance degradation reported via the client monitoring data. For example, a network event of a signal loss along a path between the endpoints may be correlated with an increase in packet loss detected by client monitoring data, whereas a network event of a traffic spike (though still below a traffic allotment) along the path may not be correlated (or may have less correlation) with the detected increase in packet loss. The above examples are illustrative, and other analysis may be performed to correlate networking events with client monitoring data without departing from the scope of this disclosure.

At 612, the method includes determining if the issue is confirmed via the correlation at 610. If no correlation is found (e.g., "NO" at 612), the method includes outputting a report that indicates that the issue does not appear to be present in the network, as indicated at 614. The method may further include continuing to monitor to determine if a higher level of alert (e.g., a subsequent detection of performance signals breaching (e.g., exceeding when the threshold is a maximum threshold or underrunning when the threshold is a minimum threshold) the threshold or exceeding a further threshold) is received from the client monitoring or if an alert from other clients (or other signaling from the other clients that indicates a performance issue related to the issue alerted by the client at 604), as indicated at 616 (e.g., if a next threshold is exceeded or underrun, indicating a worsening of the performance degradation). If no higher level alert is received, the method returns to continue monitoring. If a higher level alert (or correlating signals indicating performance degradation experienced by other clients) is received (e.g., "YES" at 616), the method includes performing additional examinations of paths between endpoints and correlating the results of the examinations with the signal from the client, as indicated at 618. For example, the additional examinations may include performing more detailed or granular path evaluations that reduce the number of aggregated path metrics being compared to the client signal data. In some examples, the additional examinations may include computing a reduced set of routes (e.g., targeted routes) through the network between the two endpoints (e.g., where a larger set of routes is computed to perform the initial examination at 610), generating reduced aggregated network-based monitoring data for the reduced set of routes (e.g., events data for the reduced set of routes and/or a reduced aggregation of network-based monitoring data used to identify events for correlation with the client-based monitoring data), and correlating events for the reduced aggregated network-based monitoring data to the client-based monitoring data to determine whether an issue is confirmed. The method then returns to 612 to again evaluate whether an issue is confirmed via correlation using the more targeted network evaluation data. It is to be understood that although the consideration of signals from other clients is shown at 616, such signals may be used at other times, such as during the correlation at 610, in some examples. For example, a threshold for confirming a network issue may not be met by network monitoring signals correlated with the client's signals received at 602, yet may be met by further including signals from other clients that indicate performance degradation in association with a same path/endpoint/etc. as the client providing the alert at 604.

If an issue is confirmed (e.g., "YES" at 612), the method may include performing a mitigation operation, such as rerouting traffic to reduce performance degradation and/or informing network management teams of the issue to instigate a network fix, and optionally outputting a report for the client that indicates that the issue is present in the network and is being addressed, as indicated at 620. For example, the optional outputs at 620 may be generated/transmitted using the alert services 120 of FIG. 1. In some examples, the method may include informing other clients that may traverse paths affected by the detected issue that the issue is present and being addressed, as indicated at 622.

Figure 7:
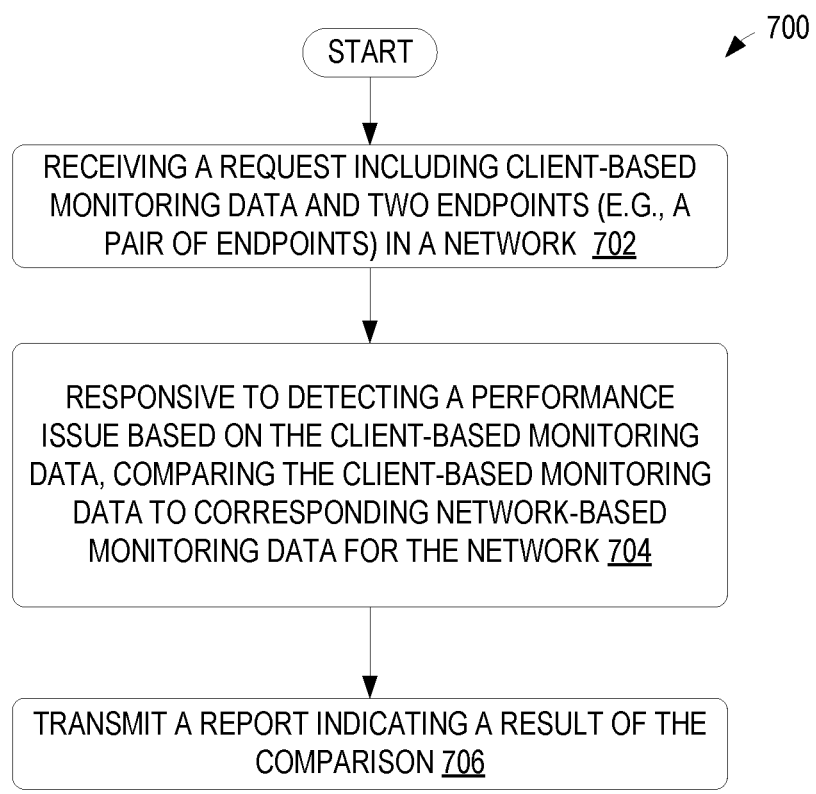
FIG. 7 is a flowchart according to another example for monitoring a network.

FIG. 7 is a flowchart according to another embodiment for monitoring a user network. For example, method 700 may be performed by a monitoring service executed in a compute service provider, such as depicted by compute service provider 112 of FIGS. 1 and/or 212 of FIG. 2. In process block 702, a request is received to monitor a network. As indicated, the request may include client-based monitoring data (e.g., monitoring data for the network from a perspective of a client accessing the network) and two endpoints (e.g., a pair of endpoints, between which a communication path exists) in the network. For example, the client-based monitoring data may include metrics for client data that traverses (or attempts to traverse) a path between the two endpoints in the network. In some examples, the request may also include one or more thresholds corresponding to the monitored data, which may be used to determine when the client-based monitoring data may be considered to indicate an issue in the network.

At 704, the method includes, responsive to detecting a performance issue (e.g., an estimated or suggested issue in the network) based on the client-based monitoring data, comparing the client-based monitoring data to corresponding network-based monitoring data for the network. For example, the client-based monitoring data may be compared to network-based monitoring data, such as results of probes injected into the network that traversed over a path between the endpoints, to determine if both perspectives of data indicate the same issue in the network (e.g., to determine that events detected by network-based monitoring could explain or be related to performance issues detected by the client-based monitoring data). At 706, the method includes transmitting a report indicating a result of the comparison. For example, the report may include an indication of whether the network-based monitoring data correlated with the client-based monitoring data confirms the issue in the network. The report may be transmitted to the client, to a management entity for the network, to other clients in the network (e.g., which may be affected by the detected performance issue), and/or other entities. For example, the report may be used to notify network management teams to mitigate the network issue, to generate a heat map or other visualization of network issues, to inform/alert clients of issues on the network, etc. In some examples, the report may be used for confirmation of the network issue, to instigate further investigation into the network issue/performance degradation, and/or to guide mitigation of the network issue.

Figure 8:
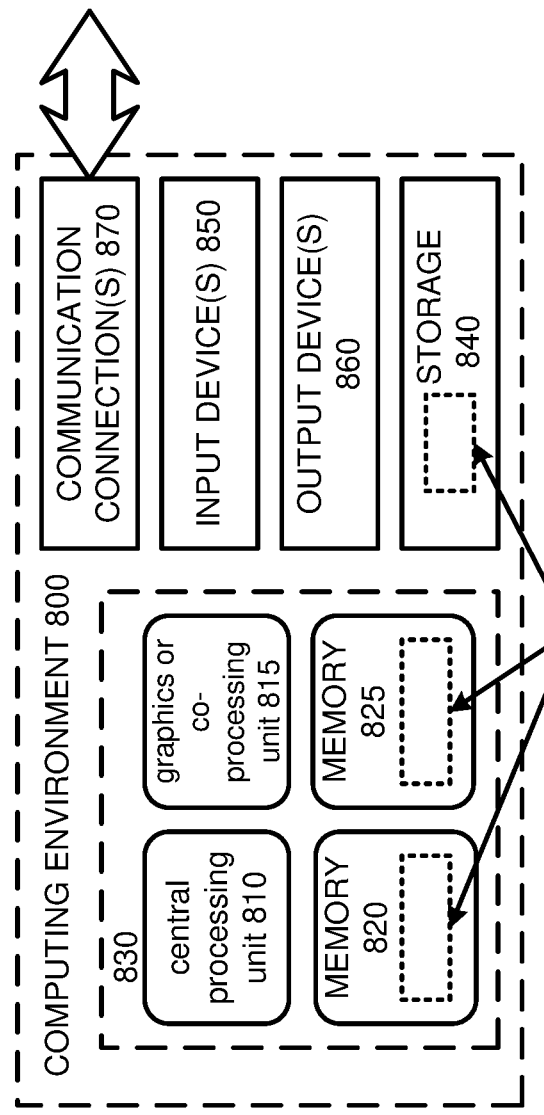
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.). In some examples, the computing environment 800 may include and/or be included in the compute service provider 112/212 of FIGS. 1 and 2, and/or the client device 202 of FIG. 2.

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, the software 880 can be executed on the central processing unit 810 in order to implement the functionality of the metric processor 170.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of monitoring a network, the method comprising:
receiving a request to monitor the network, the request including two endpoints in the network, a signal of client-based monitoring data, and a plurality of thresholds corresponding to performance signals indicated by the client-based monitoring data, the signal of client-based monitoring data including monitoring data from a perspective of a client accessing the network;
computing a first set of routes through the network between the two endpoints and aggregating network-based monitoring data for the first set of routes;
identifying one or more events on one or more routes of the first set of routes using the aggregated network-based monitoring data;
responsive to determining that the performance signals indicated by the client-based monitoring data breach a first threshold of the plurality of thresholds indicating a performance degradation, correlating the one or more events, identified using the aggregated network-based monitoring data, with the client-based monitoring data to determine whether the performance degradation indicated by the client-based monitoring data breaching the first threshold is confirmed with the network-based monitoring data to be related to a network issue;
responsive to determining that the performance signals indicated by the client-based monitoring data breach a second threshold of the plurality of thresholds indicating the performance degradation, computing a second, reduced set of routes through the network between the two endpoints, generating reduced aggregated network-based monitoring data for the second set of routes, and correlating events indicated by the reduced aggregated network-based monitoring data with the client-based monitoring data received via the signal to determine whether the performance degradation is confirmed to be related to the network issue;
generating a report indicating whether the performance degradation is confirmed to be related to the network issue; and
responsive to confirming the performance degradation is related to the network issue, performing a mitigation for the network issue.

2. The method of claim 1, wherein performing the mitigation includes identifying one or more of the reduced set of routes experiencing the network issue and redirecting traffic through the network to reduce traffic on the one or more of the reduced sets of routes.

3. The method of claim 1, wherein the performance signals include measurements of latency, packet loss, or jitter for client data directed to be transmitted along a path between the two endpoints.

4. The method of claim 1, wherein the performance signals include indications of events of connection loss, unreachable resources, or timeouts for client data directed to be transmitted along a path between the two endpoints.

5. The method of claim 1, wherein the client-based monitoring data is collected from a perspective of a cloud-based application executing on a client computing instance, and wherein the network-based monitoring data is collected from a perspective of a network monitoring service sending probe packets through the network.

6. A method, comprising:
receiving a request to monitor a network within a compute service provider, the request including two endpoints within the network and a signal of client-based monitoring data for the network, the client-based monitoring data including performance signals from one or more client-based monitors indicating one or more parameters of client traffic or events experienced by client devices attempting to access a destination in the network;
in response to detecting a performance degradation in the network based on the client-based monitoring data, comparing the client-based monitoring data received via the signal with network-based monitoring data for the network to determine if one or more events indicated by the network-based monitoring data are associated with or are a root cause for the performance degradation detected based on the client-based monitoring data;
transmitting a report indicating a result of the comparison, including an indication of whether the network-based monitoring data correlated with the client-based monitoring data confirms the performance degradation is related to an issue in the network; and
responsive to confirming the performance degradation is related to the issue in the network, performing a mitigation for the issue.

7. The method of claim 6, further comprising computing candidate routes through the network between the endpoints included in the request, wherein the network-based monitoring data is aggregated for the candidate routes.

8. The method of claim 6, wherein the request further includes one or more thresholds relating to performance signals for client communication with the network.

9. The method of claim 8, wherein the performance degradation is detected based on the client-based monitoring data breaching a selected threshold of the one or more thresholds, wherein confirming the issue in the network comprises determining that the network-based monitoring data includes an indication of one or more events that is identified as the root cause of the performance degradation detected based on the client-based monitoring data breaching the selected threshold, wherein the one or more events are identified as the root cause by determining that one or more features of the one or more events is capable of causing the performance degradation associated with the client-based monitoring data breaching the one or more thresholds.

10. The method of claim 8, further comprising detecting the issue responsive to determining that the performance signals from the client-based monitoring data breach a first threshold of the one or more thresholds, wherein the network-based monitoring data corresponds to aggregated network-based monitoring data for a plurality of candidate routes through the network between the endpoints included in the request.

11. The method of claim 10, further comprising, responsive to determining that the performance signals from the client-based monitoring data breach a second threshold of the one or more thresholds, computing one or more targeted routes through the network between the endpoints included in the request to generate a reduced aggregation of the network-based monitoring data relative to the aggregated network-based monitoring data for the plurality of candidate routes.

12. The method of claim 11, further comprising comparing the reduced aggregation of the network-based monitoring data to the client-based monitoring data and transmitting a second report indicating a result of the comparison.

13. The method of claim 6, further comprising, responsive to determining that the network-based monitoring data correlated with the client-based monitoring data confirms the issue in the network, transmitting the report to other clients of the network.

14. The method of claim 6, wherein the client-based monitoring data includes measurements of latency, packet loss, or jitter.

15. The method of claim 6, wherein the client-based monitoring data includes event detections for connection losses or spikes, unreachable resources, or timeouts.

16. One or more computer-readable storage media comprising computer-executable instructions that, when executed, cause a computing system to perform a method comprising:
- receiving a request from a client to perform network monitoring using a compute service provider, the request including a pair of endpoints in a network and a signal of client-based monitoring data captured for traffic sent between the pair of endpoints from a perspective of a client accessing the network;
- computing routes through the network between the pair of endpoints and aggregating network-based monitoring data for traffic sent along the computed routes;
- identifying one or more events on one or more paths between the pair of endpoints using the network-based monitoring data;
- in response to a first detection that performance signals indicated by the client-based monitoring data correspond to a network issue, performing a first comparison correlating the client-based monitoring data received via the signal with at least one of the one or more events indicated by corresponding network-based monitoring data to confirm whether the performance signals are caused by the network issue or by an issue outside of the network;
- in response to a second detection, subsequent to the first detection, that the performance signals indicated by the client-based monitoring data correspond to the network issue, injecting probes into the network to generate targeted network-based monitoring data for a reduced subset of the computed routes through the network between the pair of endpoints and performing a second comparison correlating the targeted network-based monitoring data with the client-based monitoring data received via the signal to confirm whether the performance signals are caused by the network issue; and
- transmitting a report to the client indicating whether the performance signals are confirmed to be caused by the network issue based on the first and second comparisons.

17. The one or more computer-readable storage media according to claim 16, wherein the instructions, upon execution, further cause the computer system to:
- determine the subset of the computed routes based on additional information from the client regarding the traffic communicated between the pair of endpoints.

18. The one or more computer-readable storage media according to claim 16, wherein the instructions, upon execution, further cause the computer system to:
- perform the first or second comparison by additionally correlating additional client-based monitoring data for other client devices with events indicated by the network-based monitoring data or targeted network-based monitoring data.

19. The one or more computer-readable storage media according to claim 16, wherein the performance signals comprise measurements of performance captured by an application executing on a client device or client computing instance of the client.

20. The one or more computer-readable storage media according to claim 19, wherein the performance signals comprise one or more of latency, packet loss, jitter, connection loss or spike event data, resource unavailability event data, or timeout event data.

* * * * *